G. T. WARWICK.
SCREW MACHINE.
APPLICATION FILED JAN. 22, 1909.
959,825.
Patented May 31, 1910.
10 SHEETS—SHEET 7.
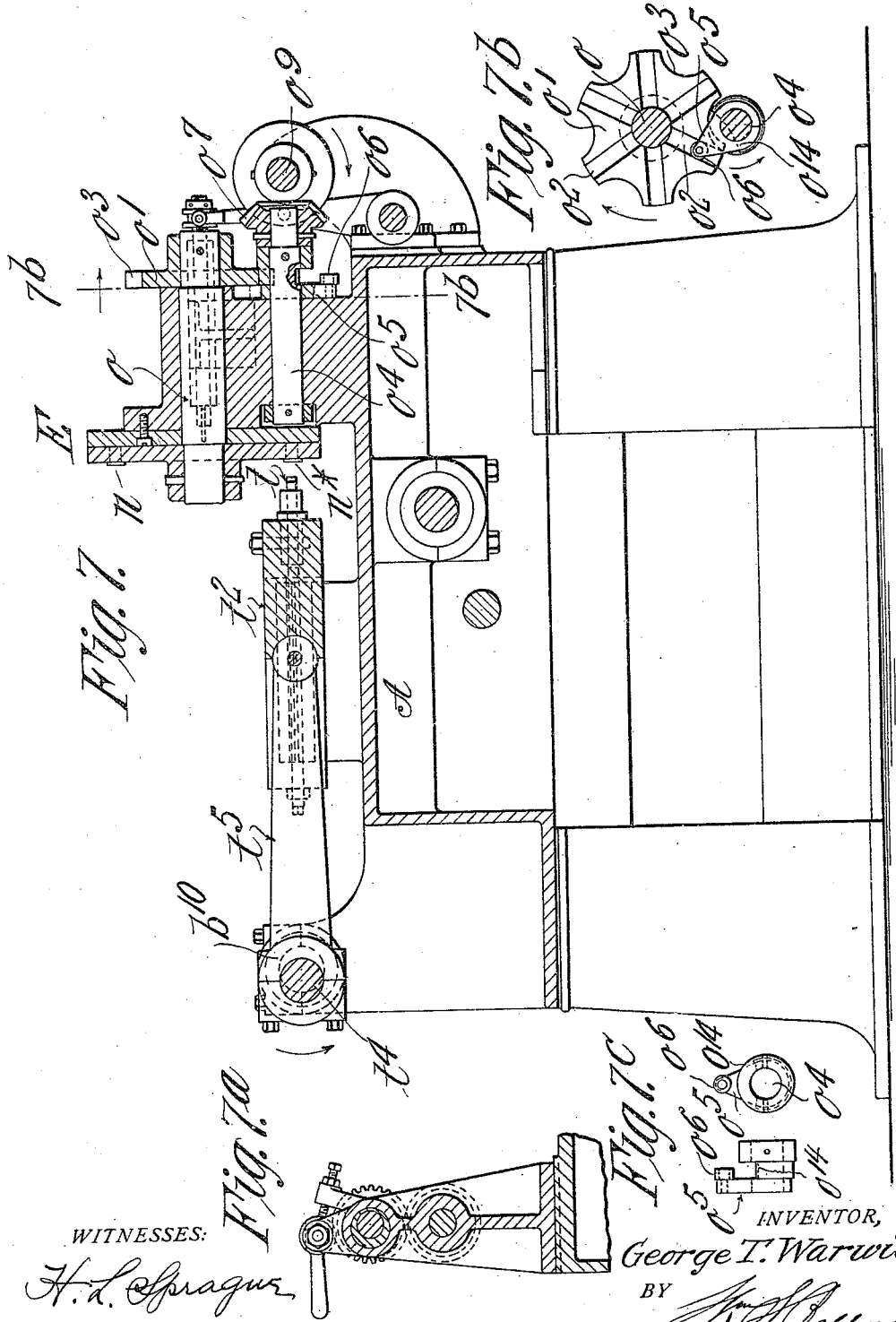
WITNESSES:
INVENTOR,
George T. Warwick,
BY
ATTORNEY.

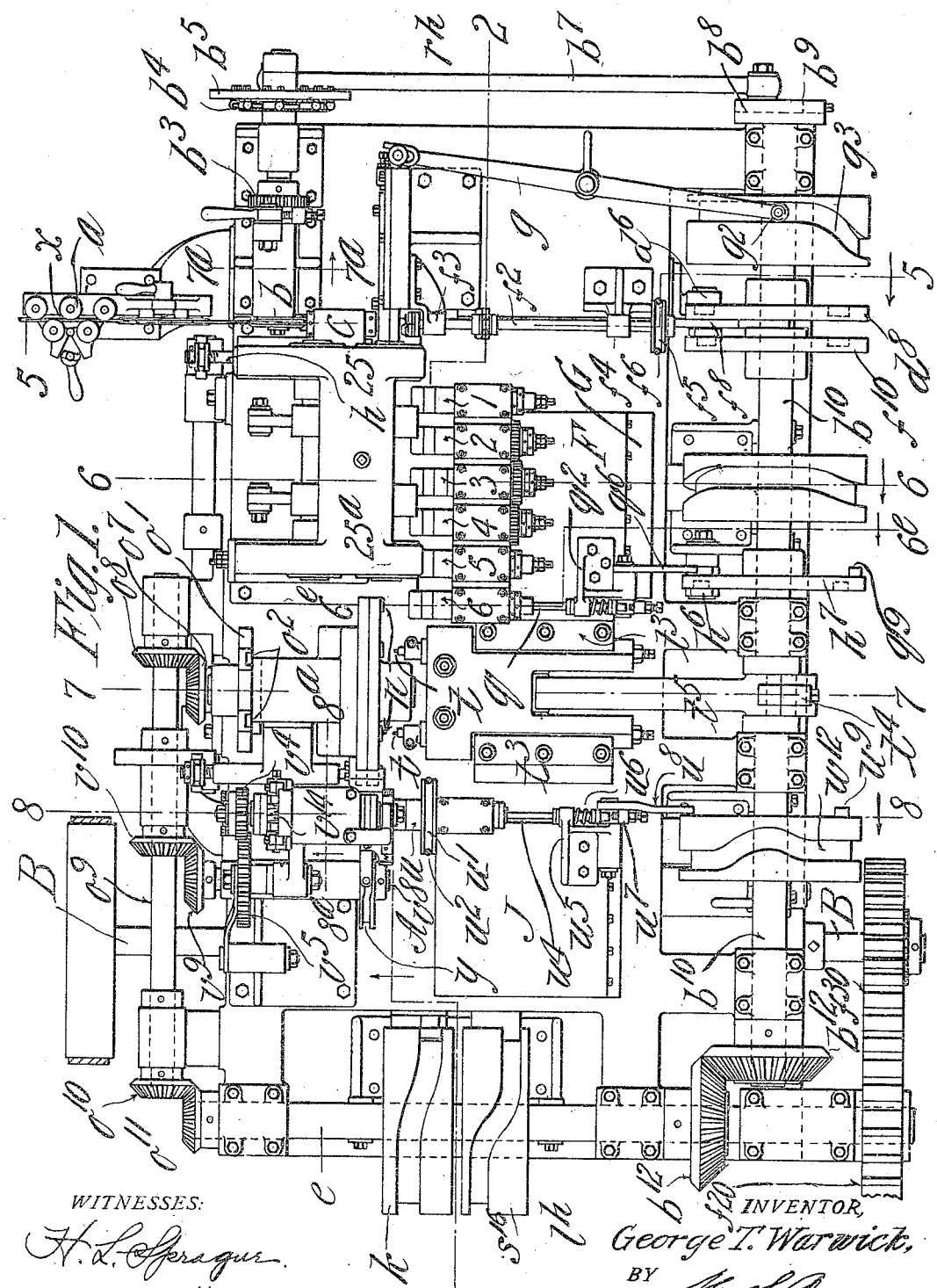

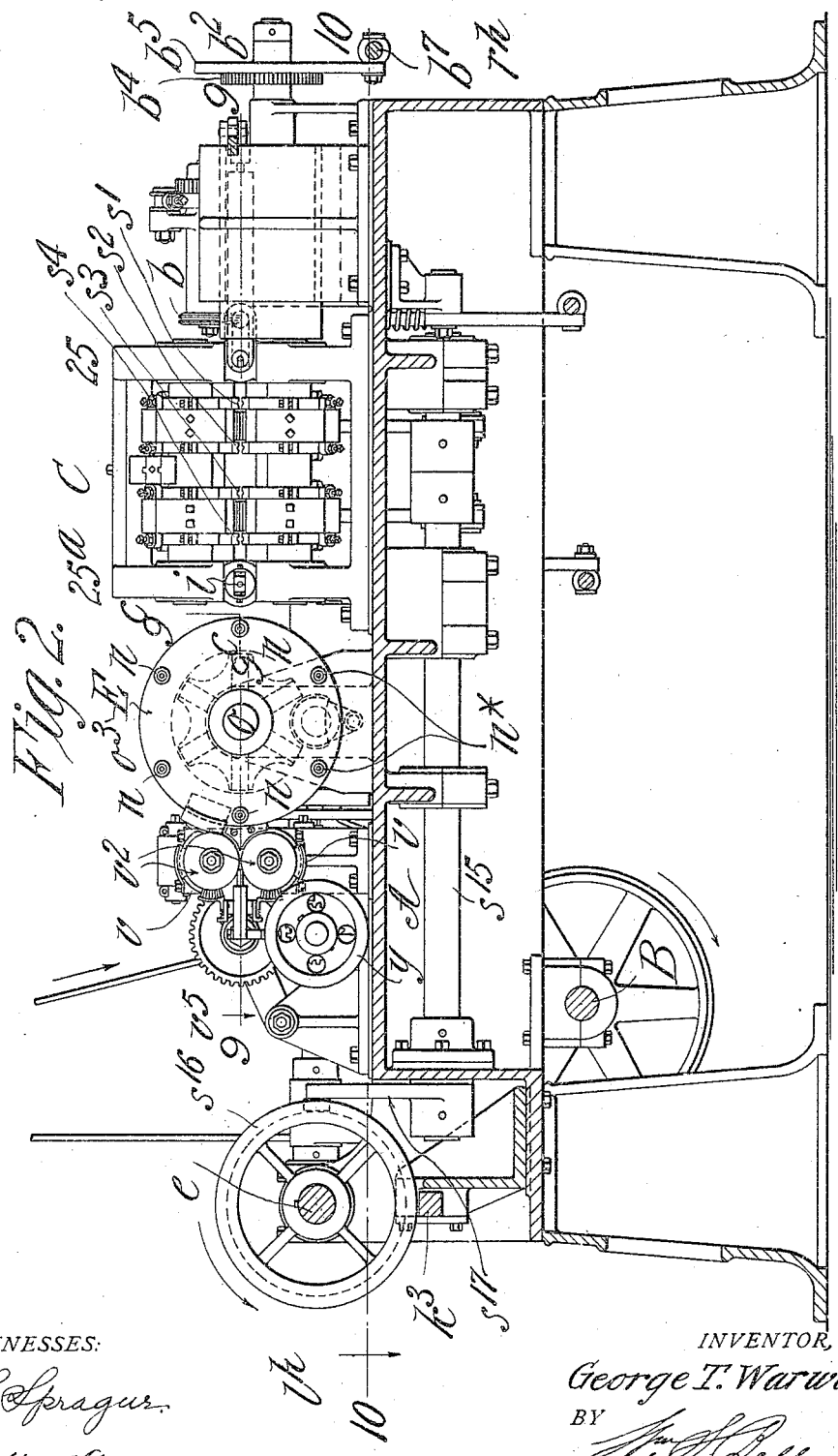

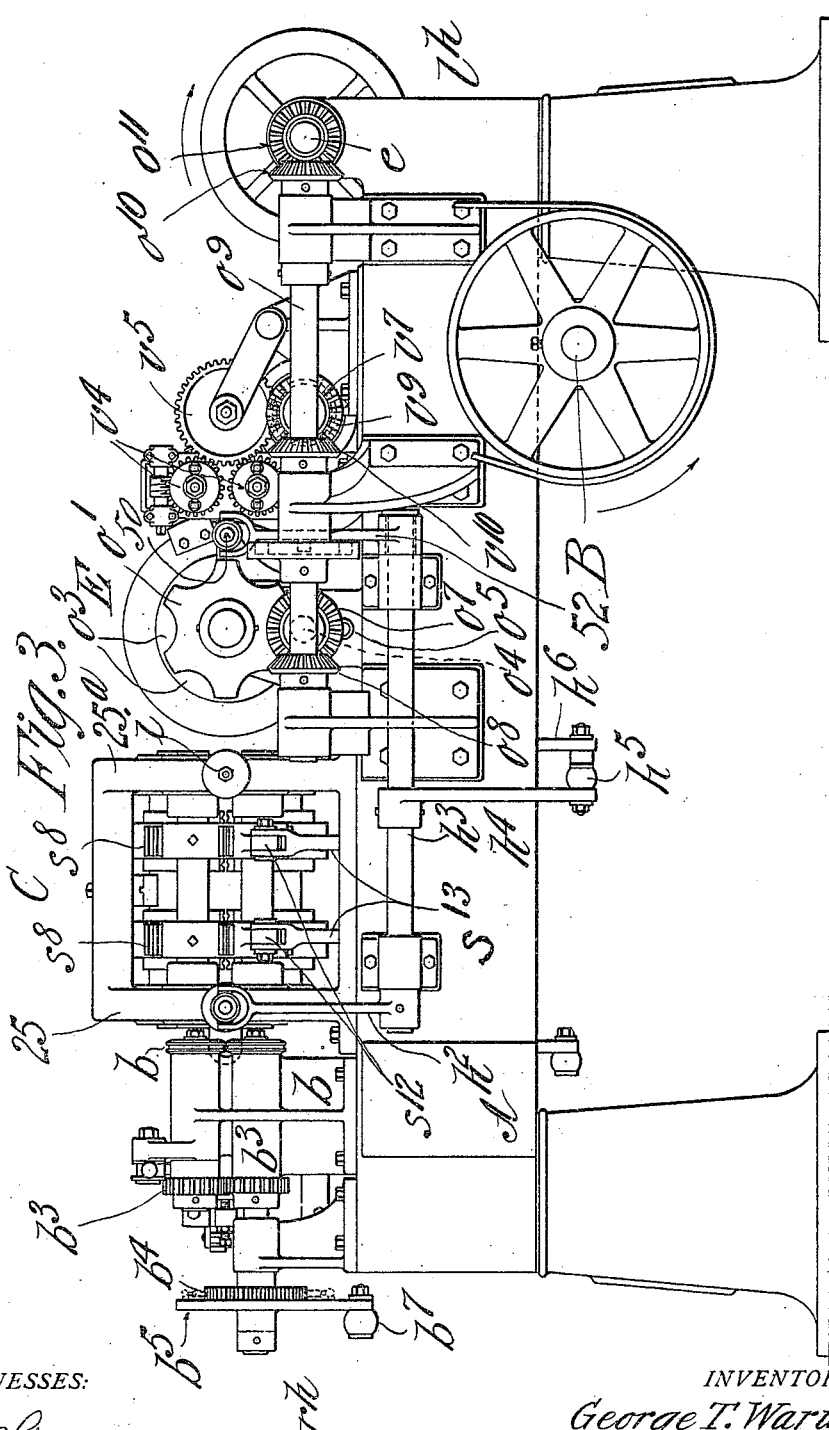

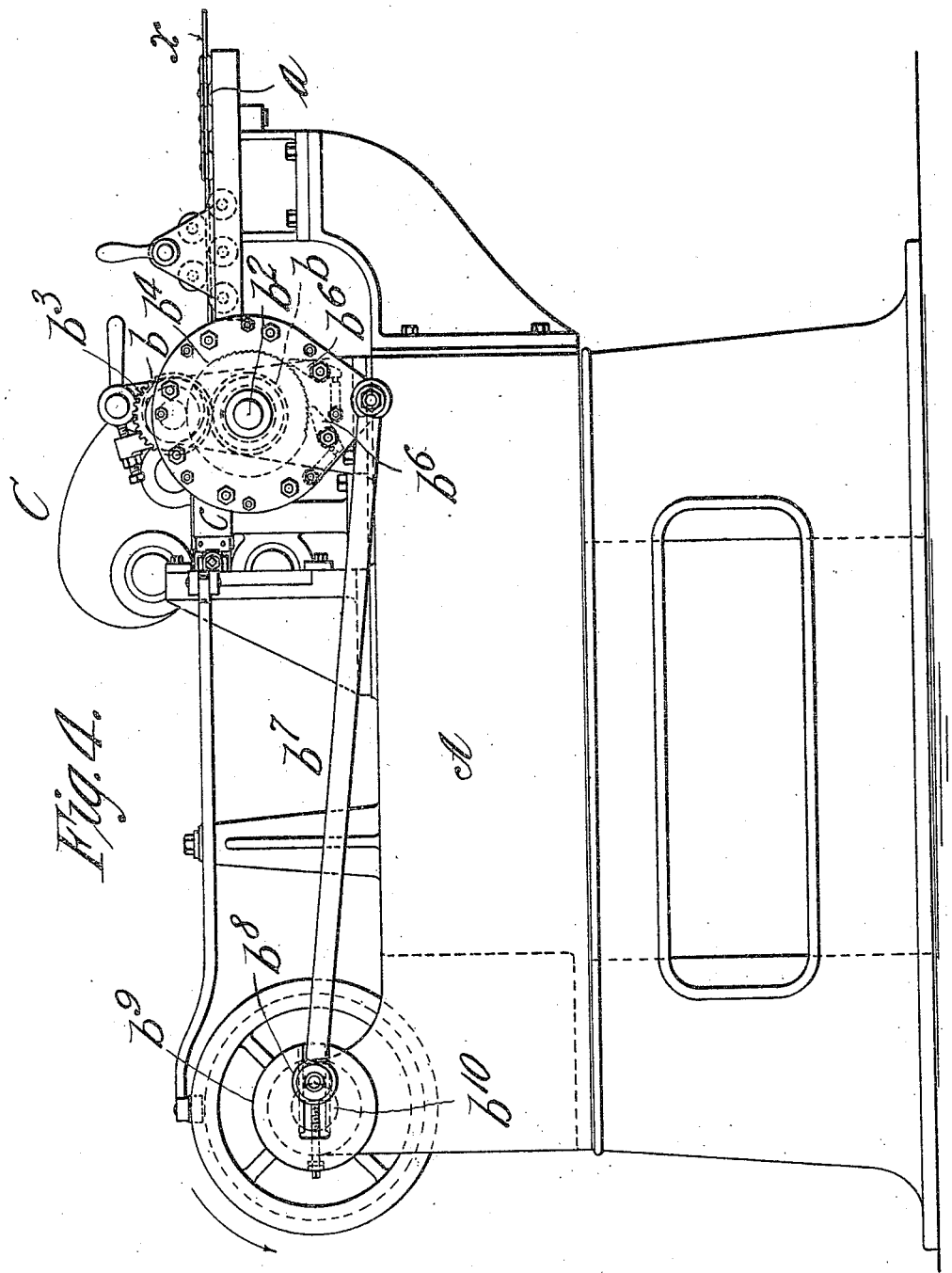

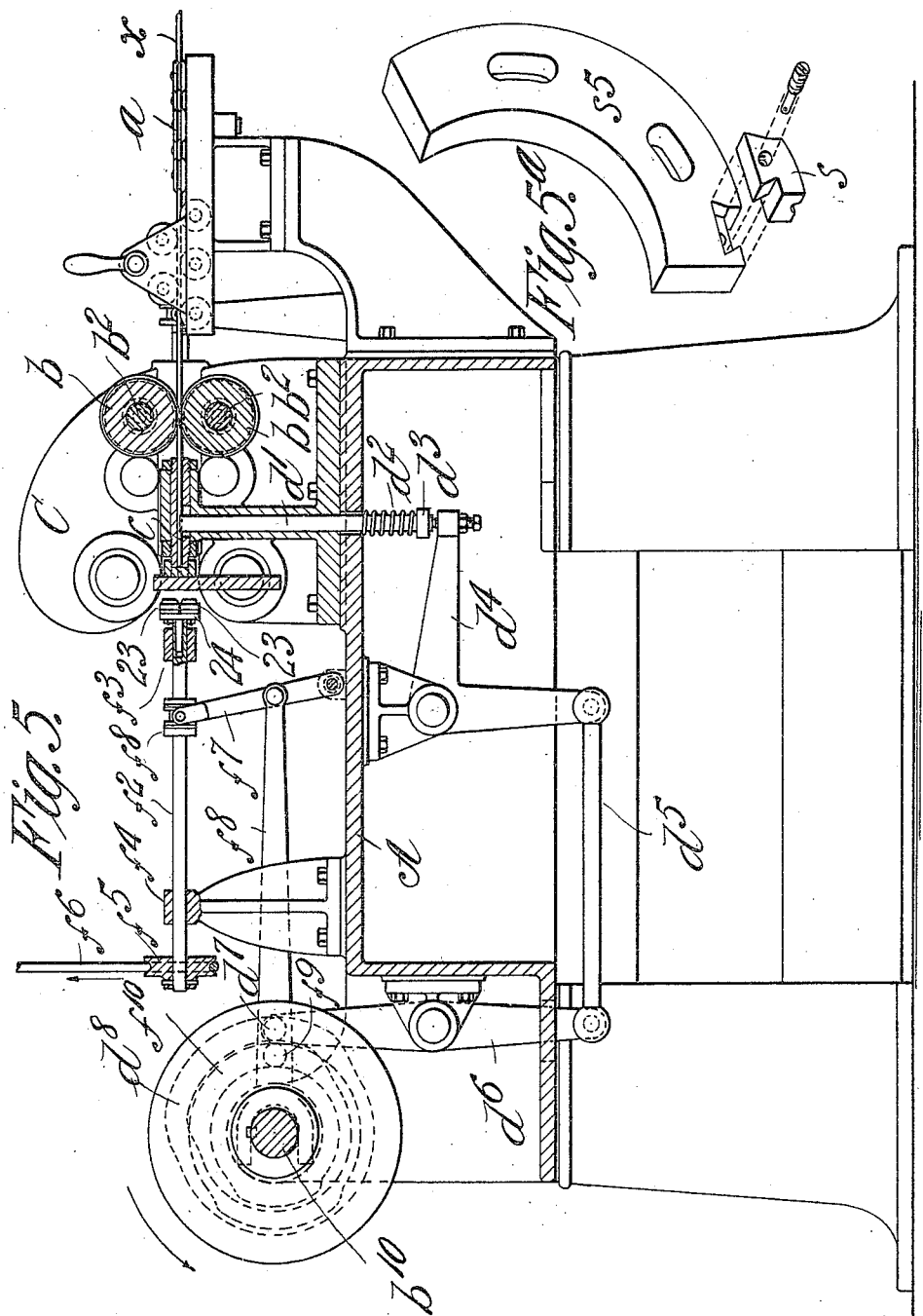

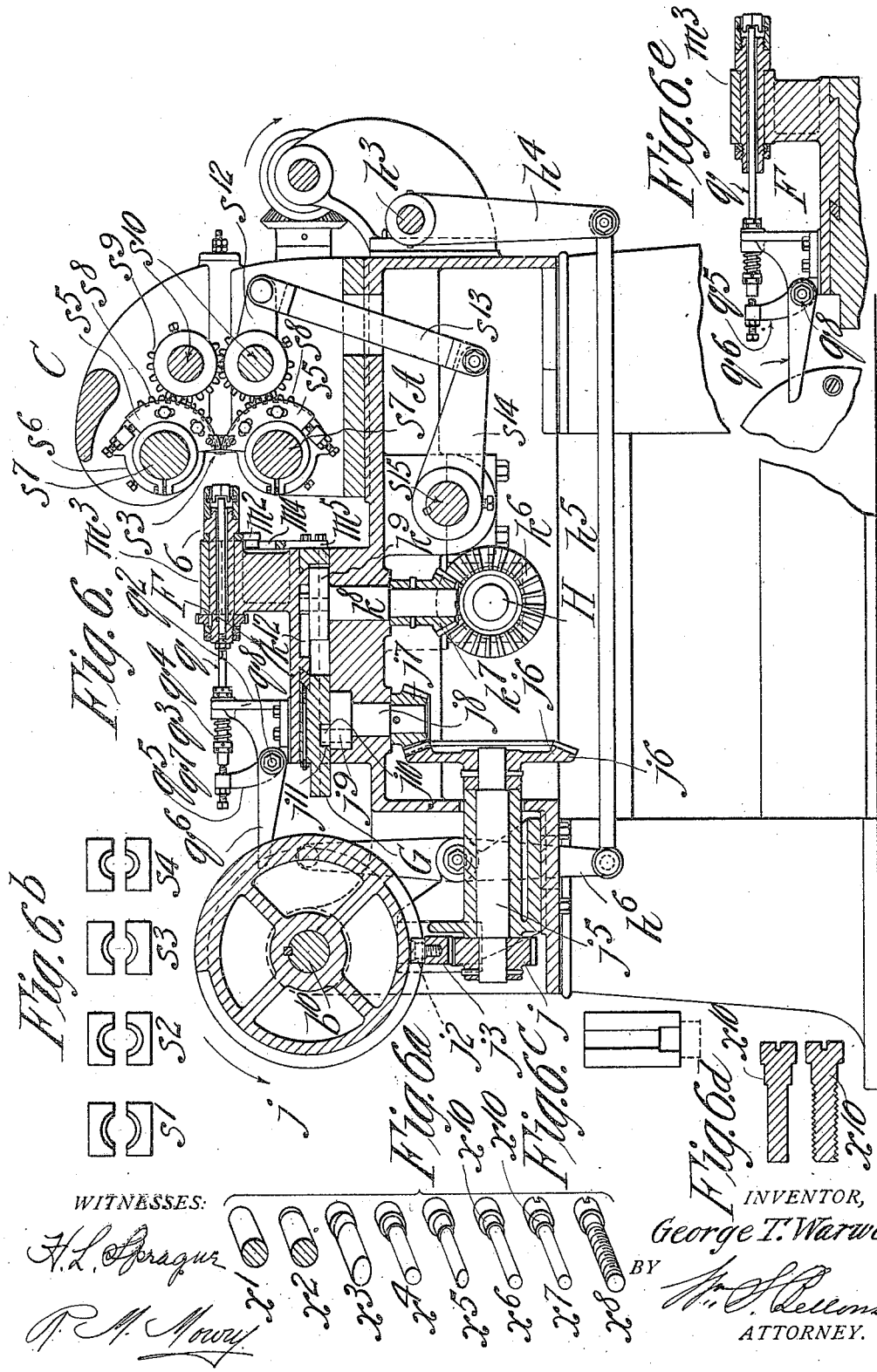

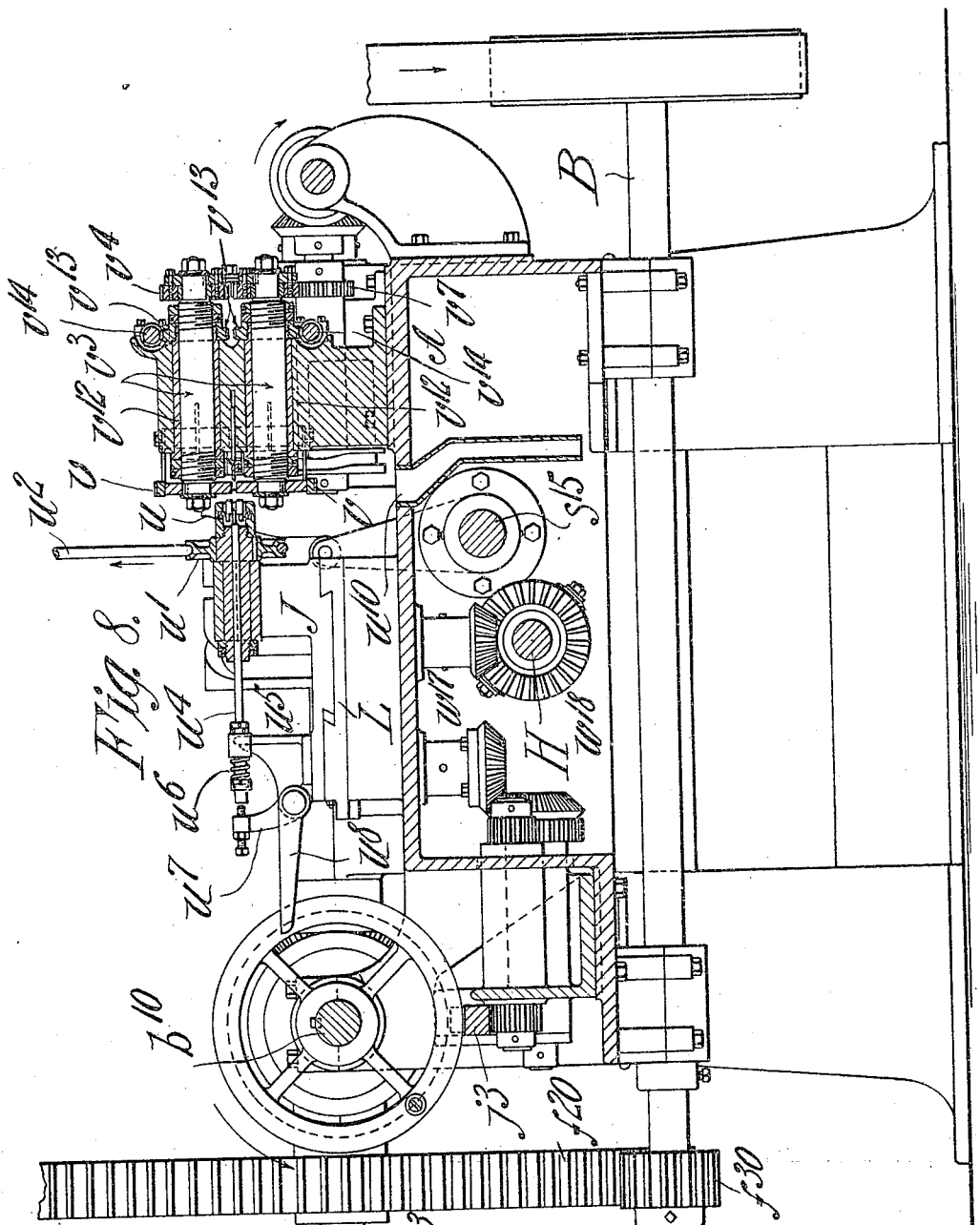

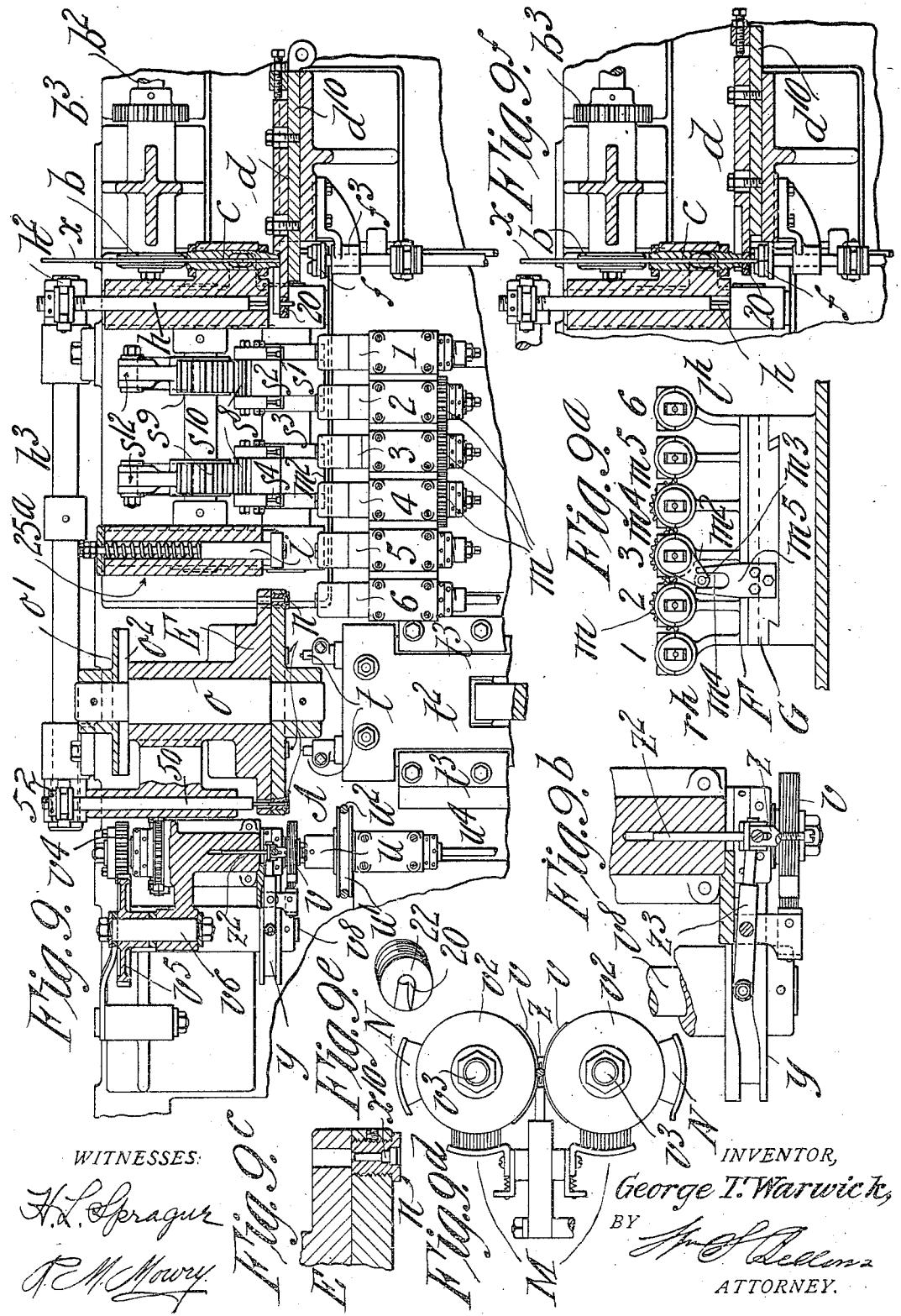

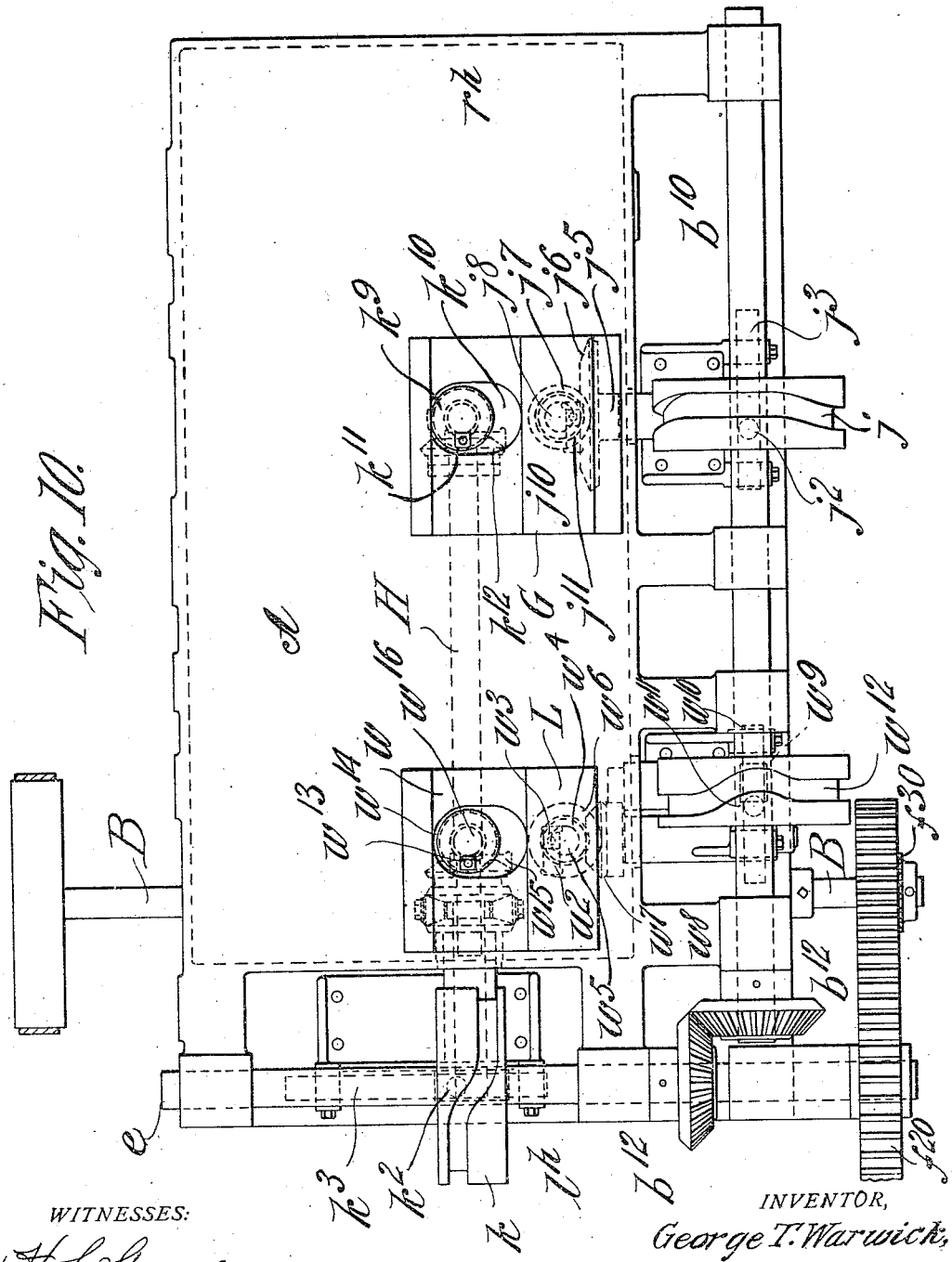

UNITED STATES PATENT OFFICE.

GEORGE T. WARWICK, OF SPRINGFIELD, MASSACHUSETTS.

SCREW-MACHINE.

959,825.    Specification of Letters Patent.    Patented May 31, 1910.

Application filed January 22, 1909. Serial No. 473,676.

*To all whom it may concern:*

Be it known that I, GEORGE T. WARWICK, a citizen of the United States of America, and resident of Springfield, in the county of Hampden and State of Massachusetts, have invented certain new and useful Improvements in Screw-Machines, of which the following is a full, clear, and exact description.

This invention relates to improvements in machines for making machine screws, and has for its object the production of a machine to feed wire from a coil in straightened condition into the machine; to round or convex the advanced end of the forwardly fed wire approximately corresponding to the desired crowning or convexity of the top of the screw head; to cut off a sufficient portion of the length of the wire to constitute a blank from which the screw is to be made; to transfer the blank successively to the actions of dies or swages whereby they are reduced and elongated for the shank portion, leaving a portion of the blank of normal diameter and of cylindrical form for the head; to further transfer the partially formed blanks to revolubly carried dies in a dial or turret, and to subject them while in the dies of such revoluble carrier to operations for both perfecting the shape of the head and producing the slot therein; to further transfer the blanks to the action of thread rolling dies, at the termination of which the blanks are subjected to an end trimming operation for removing any bur which may be left at their small ends in the thread rolling; and to finally discharge the screws in completed and perfect shape from the machine.

By the employment of this machine it is possible to produce extremely good and perfect machine screws with great rapidity and without the removal of any appreciable stock, so that from every hundred pounds of wire run into and through the machine, substantially a hundred pounds of finished screws are brought out, no turning, cutting away or otherwise removing any appreciable portion of the stock being required; and the rapidity of production is largely due to the fact that the machine, because of the manner of its organization, performs different screw forming operations on a number of different blanks simultaneously.

The invention consists in the combinations or arrangements of devices or mechanisms, and the constructions of the mechanisms, and parts thereof, all substantially as hereinafter described in conjunction with the accompanying drawings and as set forth in the claims.

In the drawings:—Figure 1 is a plan view of the machine; Fig. 2 is a sectional elevation as taken on and seen beyond the plane indicated by line 2—2, Fig. 1; Fig. 3 is a rear elevation of the machine; Fig. 4 is an elevation at the right hand end of the machine; Fig. 5 is a vertical cross section on line 5—5, Fig. 1; Fig. 5$^a$ is a perspective view showing one of the holders and swaging tools of one of the several swaging or screw shank forming mechanisms. Fig. 6 is a vertical cross section on line 6—6, Fig. 1. Fig. 6$^a$ is a perspective view showing firstly the blank and in succession the formations imparted thereto by the machine for the production of the complete head slotted and shank threaded machine screw; Fig. 6$^b$ is a front view of a series of four sets of swaging dies, particularly indicating the variations in the cross sectional contours and sizes of the die openings therein; Fig. 6$^c$ is a plan view of one of a pair of the swaging dies or tools; Fig. 6$^d$ is a view comprising longitudinal sections on a screw blank, the one in its condition before, and the other after the thread rolling; Fig. 6$^e$ is a partial vertical sectional view transversely of the machine as taken on line 6$^e$—6$^e$, Fig. 1, for particularly showing the ejector mechanism for one of the chucks; Fig. 7 is a vertical cross sectional view taken on line 7—7, Fig. 1, through the revoluble carrier for the dies in which the screw heads are perfected as to shape and also showing the slot forming die; Fig. 7$^a$ is a vertical sectional view through devices in the machine as taken on the plane indicated by line 7$^a$—7$^a$, Fig. 1; Fig. 7$^b$ is a partial sectional elevation as taken on line 7$^b$—7$^b$, Fig. 7; Fig. 7$^c$ is in part a face view and in part a side view of an element represented in Figs. 7 and 7$^b$ to be hereinafter particularly referred to. Fig. 8 is a vertical section from front to rear through the portion of the machine at which the thread rolling is accomplished, and as taken on the line 8—8, Fig. 1; Fig. 8$^a$ is a vertical section through devices in the machine as seen on the plane indicated by line 8$^a$—8$^a$, Fig. 1; Fig. 9 is a horizontal sectional view through a major portion of the machine, on a somewhat larger scale, taken on line 9—9, Fig. 2; Fig. 9ª is a rear elevation of the series of six transferring chucks comprised in this machine and the movable support on which they are mounted; Fig. 9ᵇ is a horizontal sectional view on a larger scale, even than Fig. 9, and for more clearly illustrating the bur removing device which has its location for operation between the rolls which carry the segmental thread rolling tools or dies; Fig. 9ᶜ is a sectional view on the large scale through a portion of the revoluble carrier for a plurality of dies in which the partially made screws are carried for being subjected to the head perfecting and slotting operations; Fig. 9ᵈ is a front view of the pair of wheels or cylindrical supports on which the segmental thread rolling dies are circumferentially carried; Fig. 9ᵉ is a perspective view of a die or tool included in the shear or cutting off mechanism which separates a screw blank forming piece from the supply wire or stock; Fig. 9ᶠ is a view showing parts in horizontal section corresponding to Fig. 9, but in different relative positions; Fig. 10 is a plan view of sufficient of the machine to contribute in the illustration of the means for imparting the U-shaped movements to slides or carriages on which the transferring chucks are mounted.

The above described drawings, in which similar characters of reference indicate corresponding parts throughout all of the views, were reproduced from an actually designed and constructed, and successfully operating machine.

The operating mechanisms and driving means therefor are mounted on a broad table-like frame A, and B represents the driving shaft from which all of the movements to the various mechanisms are primarily imparted.

The wire at $x$ of comparatively large diameter and exactly or approximately that of the heads of the screws desired to be produced is fed off from a supply coil at the rear of the right hand end of the machine through a series of straightening rolls $a$,—involving no invention,—between upper and lower wire feeding rolls $b$ $b$ through a tubular or bored guide $c$ supported by part of the machine frame and into and more or less through an aperture 20 in a shearing die member 22 made in the form of a hardened piece or bushing set into and made as one with a reciprocating bar $d$, the rear face of which is in contact, for shearing action, against the forward end of the tubular wire guide C.

The wire feed rollers $b$ $b$ which are peripherally grooved and adjusted to have a frictional or die feeding movement on the wire are carried on arbors $b^2$, $b^2$, arranged in parallelism and connected by gearing $b^3$ to run in unison and the lower one of the arbors $b^2$ is positively intermittently rotationally moved in any required extent as predetermined for the length of forward feed of wire at each time corresponding to the length of the screws required to be made, by means as follows:

The lower arbor has a very fine toothed ratchet wheel $b^4$ affixed thereon adjacent which oscillates a circular carrier $b^5$ for a plurality of pawls $b^6$ which take into the teeth of the ratchet wheel, and being five or six in number and properly positioned relatively to the teeth of the ratchet wheel insure in the working direction of the pawl carrier an immediate and positive impulse to the ratchet wheel and feed rolls with no lost motion.

The pawl carrying disk $b^5$ has a connecting rod $b^7$ pivoted thereto and also connected with a block $b^8$ which is adjustably slidable radially relatively to a face plate $b^9$ carried on a shaft $b^{10}$, which ranges along the front of the machine and is driven by mitered gear wheels $b^{12}$, $b^{12}$, one of which is on a shaft $e$ arranged transversely at the left hand end of the machine and having thereon a very large spur gear wheel $f^{20}$ meshed and driven by a pinion spur wheel $f^{30}$ on the main driving shaft B.

Under the continuous running of the shaft $b^{10}$, the wire will be intermittently advanced and in an extent as regulated by the adjustment of the point of engagement of the connecting rod $b^7$ nearer or farther from the center of the face plate $b^9$; and the length of each forwardly fed part of the wire is that of the blank or piece from which the screw is to be made, such blank being longer or shorter as predetermined.

The advanced end portion of the wire fed beyond the end of the tubular guide $c$ and through the aperture 20 in the shear bar $d$ is held while its forward end has a convex form imparted thereto and before the blank constituting portion is cut off by a device clearly shown in Fig. 5. Such wire holding device comprises a thrust rod $d^1$ which plays vertically through a tubular guide therefor, which opens into the passage through the tubular wire guide $c$. This thrust rod $d^1$ is maintained in its downwardly retracted position by the spiral spring $d^2$ engaged between and under part of the frame and a shoulder $d^3$ on the rod. The rod is, at its lower extremity, engaged by the horizontal arm of a bell crank lever $d^4$ to the vertical arm of which a link $d^5$ is connected by one end, such link by its other end being connected to an intermediately pivoted vertical lever $d^6$, the upper end of which carries the stud or roll $d^7$ which extends into the path or slot of the cam $d^8$ affixed on and revoluble with the shaft $b^{10}$.

In its proper time, through the cam actuated connections, the rod $d^1$ is forced against its spring and maintained to hold the wire against any rearward movement, as might be induced either by the recoil of the wire or the pressure against the advanced end by the convexing tool or device $f$. This convexing device, as shown, in the present instance, comprises a pair of hardened steel rolls 23, 23, with concaved edges, said rolls being pivotally mounted, at the opposite sides of its center, on a plate or bar 24 which is carried on a rotative spindle $f^2$, supported and guided through brackets $f^3$, $f^4$,—a continuous rotation being imparted to said spindle by the running on its pulley $f^5$ of the belt $f^6$ driven from overhead.

The means for rearwardly moving the spindle $f^2$ and the convexing rolls 23, 23, for their action against the end of the forwardly fed wire, before the same is cut off, consists of a forked lever $f^7$ embracing a peripherally grooved fixed collar $f^8$ on the spindle, said lever at its lower end being pivoted to the frame and having pivotally connected thereto a thrust rod $f^8$, the forward forked end of which embraces the shaft $b^{10}$ while the stud or roll $f^9$ engages in the slot or path of the cam $f^{10}$, which is on the shaft $b^{10}$, closely alongside the cam $d^8$. The action of these rollers moved endwise against the advanced end of the wire is to impart to such wire end a rounded formation exactly or usually only approximately corresponding to the convexity required for the finished screw.

The convexing tools, so soon as they have performed their work, forwardly retiring, the shear bar $d$ has imparted thereto its movement horizontally in a direction from the right hand toward the left hand end of the machine for cutting off the portion of the wire which has been carried through and forwardly protrudes beyond the opening 20. This motion is imparted by the properly timed swinging movement of the lever $g$, which, at its rear end, is pivotally connected to the shear bar $d$ or to the slide $d^1$ which is unitary therewith, such lever $g$ having a cam stud at its forward end working in the peripheral slot of the cam $g^3$.

The shear bar in addition to squarely cutting off the sufficient portion of the wire to make the blank, transfers the so cut-off portion from the position indicated in Fig. $9^f$ to the position indicated in Fig. 9,—that is the die opening and the wire piece or blank is brought opposite and just forward of an ejector represented at $h$ and comprising a rod with a reduced forward end which plays through a horizontal bore therefor in the side upright 25 of the head frame C (within which the swaging mechanisms are mounted). The object of this ejector is to push the blank from its rear end in a forward direction into the first one, 1, of the series of transferring chucks numbered 1 to 6, and which first or right hand one of the chucks acquires a position in axial alinement with the ejector and the blank, at the time when the ejector is operated, and as hereinafter further referred to.

The ejector has its properly timed movements imparted thereto by the engagement therewith at its rear end of a lever $h^2$, on a rockshaft $h^3$ at the rear of the machine (Figs. 1, 3, and 9), the rocking motion of which shaft is acquired through the connection of the link $h^5$ with the lever $h^4$ extended from the shaft, said link at its forward end being connected with an intermediately pivoted lever $h^6$ which is operated by cam $h^7$ on the shaft $b^{10}$.

All of the chucks of the series of six mounted to have their transferring movements in unison are spring jaw chucks of any simple known or approved construction, and not necessarily herein illustrated or described in detail, it being sufficient to say that when they are at their blank receiving ends forced against the blank, or the blank is forced endwise relatively to the chuck, the jaws of the latter will spring apart to let the blank in and then react to hold the blank with sufficient reliability,—it, furthermore, being stated in this connection that when the blank, for instance, is transferred by one of the chucks to be between companion swaging dies and is held by the powerful pressure of such dies between them, the chuck in having its retiring motion will pull itself away from the blank held in the closed swaging dies.

In the head frame C are four sets or pairs of swaging dies, the working points or lines of which in Figs. 2 and 9 are represented by the characters $s^1$, $s^2$, $s^3$ and $s^4$, and one of the sets of these swaging dies is represented in Fig. 6 in conjunction with the means for operating the same,—their opening and closing movements all being simultaneous and accomplished through duplicated mechanism shortly hereinafter to be described; and it will be further stated that the swaging mechanisms are all alike as to general character, as well as mode of operation with the exception, however, that the paired dies or swaging tools for each successive operation or advanced stage of screw production are of slightly different formations for their required work.

The swaging dies $s^1$ to $s^4$ in pairs or companion sets, are set and secured in arc shaped holders $s^5$, mounted for slight adjustments revolubly on encircling straps or collars $s^6$ on shafts $s^7$ mounted in the head C. Each of the straps or collars has segmental gears $s^8$ in mesh with which are segmental gears $s^9$ mounted for rocking movements on the studs or shafts $s^{10}$, one of which segmental gears $s^9$ has a lever arm or crank $s^{12}$, through which the rocking movement is imparted to the sector gear by the link $s^{13}$ connected with the lever arm $s^{14}$ on a shaft $s^{15}$ operated by cam at $s^{16}$ and cam lever $s^{17}$. The swages in their actions, by means of the mechanisms for imparting their movements thereto are brought together for compressing and also elongating the blanks, and then, at proper times, for opening or separating movements to leave the swaged blanks free to be removed and transferred to their further positions.

The first set of swage dies at the point $s'$ have their cavities of the form represented in front end view at the left of Fig. 6$^b$, and a view of one of these swages as seen at its die face is represented in Fig. 6$^c$, whereby, as will be perceived, on the understanding that the blank is introduced for the greater portion, but not the whole, of its length between the dies, the reduced portion for constituting the shank is made with a shoulder $x^{10}$, Fig. 6$^a$ next to the head so that in the final rolling of the thread onto the shank from the end of the shoulder $x^{10}$ and the end of the screw the metal set up or outwardly displaced in the rolling operation will be so done that the points or apexes of the threads will be circumferentially coincident with the shoulder $x^{10}$, as shown at $x^8$, in the lower portion of Fig. 6$^a$ and in Fig. 6$^d$.

Reverting to the first pair of swage dies located at $s'$ and represented at the left of Fig. 6$^b$, it will be perceived that the die cavities together have the formation of an ellipse with its long axis horizontal and these swages bring the blank to the condition or formation shown at $x^3$, Fig. 6$^a$. The next set of swages at $s^2$ have their die cavities complemental to a cylinder of reduced diameter as further shown in Fig. 6$^b$ for bringing the blank to the condition represented at $x^4$ in Fig. 6$^a$. The third set of swage dies have their die cavities for the reduction of the blank to the condition and form shown at $x^5$ while the fourth and last set of the swages at $s^4$ have their die cavities complemental to the form of the cylinder of reduced diameter for bringing the blank to the form and condition shown at $x^6$ wherein the same has the head and shoulder $x^{10}$ next thereto and the shank reduced and elongated.

The set of six chucks all moving in unison through a path which describes the form of a U are operative for the transferring or successive progression of six blanks horizontally and simultaneously from right to left of the machine. The chuck when it is moved to the rightward from its position shown in Figs. 1 and 9 and also to its limit rearwardly from such position receives the blank, pushed by the ejector $h$ out from the aperture in the shear bar $d$ and into this chuck, which chuck thereupon moves firstly forwardly, then to the leftward to the position shown in Figs. 1 and 9, and then rearwardly to present the blank, for the greater portion of its length between the first set of swage dies at $s'$. The chuck here having a momentary dwell, the first set of swage dies close thereupon to make the blank as shown at $x^3$, Fig. 6$^a$. The swage dies also momentarily remain in their closed relations holding the blank with a very powerful pressure so that the chuck 1,—in having its return movement first in a straight line forwardly, next to the rightward and then in a straight line rearwardly to receive another blank which will be pushed out from the shear by the ejector,—in forwardly moving away from the swages will strip itself, as permitted by the spring nature of the jaws thereof, off from the head constituting portion of the blank which had been grasped by it. The second chuck, 2, having a motion in a U-path when chuck 1 is brought to its position for receiving the blank by the action of the ejector, is brought to position to grasp the portion of a blank protruding forwardly beyond the first set of swages and when another blank is brought to the first set of swages the blank which was in this set is carried to and between the second swages at $s^2$. The third chuck likewise transfers blanks from the second set of swages to the third set at $s^3$; and the chuck $s^4$ concurrently transfers blanks from the third set of swages to the fourth set at $s^4$. The chuck 5, having likewise the movements in a U-path, transfers the blank in the condition shown at $x^6$, Fig. 6$^a$ into a spring jaw chuck or holder $i$ which is located in the left hand upright 25$^a$ of the head C, and shown in Figs. 2 and 9, and the location of which is indicated in Fig. 3. The chuck 6, simultaneously with the carrying of blanks into the four sets of swaging dies transfers the blank left at the stopping place intermediate between the last swages and the dial or revoluble carrier E having a regularly spaced circularly arranged series of dies in which the head formation of each screw is perfected, the shank straightened, if needed to be, and the head slot produced.

The chucks numbered 1 to 6 inclusive are mounted on a stand and all axially in parallelism, such stand being attached to and formed as a part of a carriage or slide F which is movable in a direction from right to left and vice-versa in the dovetail way of a second carriage or slide G which has a motion from front to rear of the machine, and vice versa. The movements longitudinally of the upper slide F are imparted at different times from that of the transverse movements of the lower slide G. The transverse movements of the lower slide G are imparted by means which will be now described.

$j$ represents a cam on the shaft $b^{10}$ at the front of the machine, in the cam groove of which engages a roller or stud $j^2$ of a horizontally guided rack bar $j^3$ which runs in mesh on the top of a spur gear wheel $j^4$ at the forward end of a short shaft $j^5$ which carries at its inner end a bevel gear wheel $j^6$ in mesh with a smaller bevel gear wheel $j^7$ on a vertical stud shaft $j^8$ which carries at its upper end a disk $j^9$ provided with an upstanding lug or block $j^{10}$. This lug or block engages in a slot $j^{11}$ in the under portion of the carriage $g$, the length of such slot being longitudinally of the machine. The cam $j$ giving first a right to left, and thereafter a left to right movement to the rack bar will, through the described gearing connections, oscillate the lug $j^{10}$ and cause the slide G to have its transverse movements. The movements imparted in the longitudinal line of the machine to the upper carriage F so that the chucks when they are forwardly positioned will have their blank transferring or return motions are by means which will be now pointed out.

On the transverse shaft at the left hand end of the machine is a cam $k$ in the circumferential slot of which a cam roller or stud $k^2$ engages, such being an upstanding member of a rack bar $k^3$ which is horizontally transversely slidable at the left hand end of the machine, and the location of which is indicated in Fig. 10. This rack bar rides in mesh with gearing appurtenant to a longitudinally ranging shaft H which extends under the bed of the machine to a point beneath the carriages F and G and has a bevel gear wheel $k^6$ which is in mesh with a smaller bevel gear wheel $k^7$ on a vertical shaft $k^8$ mounted for its partial rotary movements in suitable bearings therefor of the machine frame; and this shaft at its upper end is provided with a disk $k^9$ which is accommodated within the transversely elongated slot $k^{10}$ in the lower slide G and this disk $k^9$ has an upstanding lug or stud $k^{11}$ which engages in a straight slot $k^{12}$, the length of which is transverse of the length of the machine, and which is shown in the sectional view, Fig. 6 and the location of which is represented by the broken lines in Fig. 10.

The chucks, 2, 3 and 4, partake of quarter rotary motions in their transferring movements bodily longitudinally of the machine as imparted by means next pointed out. The chucks, 2, 3 4, being rotatively mounted in their supports have sector gears $m$, $m$, affixed thereon at or near their outer ends which are in mesh one with another. One of the chucks, for instance the one 3, has a short downwardly extended crank arm $m^2$ at its rear portion which has a stud $m^3$ thereon and which engages in a vertical slot $m^4$ in an upstanding bar or plate $m^5$ which is affixed to the lower slide or carriage G so that when the lower carriage has its longitudinal movements relatively to the then stationary upper carriage on which the chucks are directly mounted, the slotted upstanding bar will act to swing the lever $m^2$ and rock, through a quarter of a rotation, the chuck 3, which through the sector gearing will impart quarter turn movements to the chucks 2 and 4 in mesh therewith.

Considering the effect of the turning action of chuck 2: It after receiving the blanks subjected to the first die swaging action at the point $s'$—whereat the blank by being somewhat elongated is brought cross sectionally to the form of an ellipse, the long axis of which is horizontal,—in its introduction of such blank into the second set of swaging dies at $s^2$, presents the cross sectionally elliptical blank with its long axis vertically, and while the chuck 3 has the quarter turn movement, beneficial in a degree, this action is to some extent only incidental to the organization and not regarded as absolutely an essential, but chuck 4 likewise performs the important function of transferring the blank from the swaging dies at $s^3$ whereat they are cross sectionally elliptical with the long axis horizontal to presentation into the fourth set of swaging dies at $s^4$ with the long axis in a vertical disposition, all for manifest necessity or desirability in carrying out, in part, the objects of this invention. Inasmuch as the last one of the chucks, 6, operates to carry a blank from the chuck or spring jawed holder $i$ to a die cavity in the revoluble dial, in which latter there is not, and should not be, any means beyond slight friction for the retention of the blank, the chuck has as an appurtenance thereof a mechanical blank ejector shown in Fig. 6, the components of which will be pointed out as follows:—The chuck 6 has within and forwardly extending from its tubular body an ejecting rod $q$, the rear end of which is normally within and just behind the jaws and to be, practically, against the head end of the blank in the chuck. The forwardly extending portion of the ejector rod plays through a guide in a bracket $q^2$ on the upper chuck carrying slide F, and has between the bracket and collar $q^3$ a retracting spring $q^4$. A device comprising double lever arms $q^5$ and $q^6$ is pivotally mounted on the slide F so that the adjustable screw $q^7$ of the arm $q^5$ is always in contact against the forward end of the ejector rod. This lever device moving bodily from right to left and return, with the chuck carrying slide, periodically comes within the range of revoluble movement of the roller stud $q^9$ extending from the face of the disk $h^7$ affixed on the horizontal shaft $b^{10}$ at the front of the machine, which may be the same disk as that comprising the cam for operating the ejector $h$. Therefore, when the carriage for the chucks is in the left hand and transferring position shown in Fig. 1, the ejector actuating lever device has its arm $q^6$ positioned to be engaged for an instant by the revolving stud $q^9$ and operated to force the blank out from the chuck 6 into the die cavity in the dial horizontally to the right of its center and in axial alinement with the chuck.

The advantage of inclusion of the stationary chuck $i$ at a location between the swaging mechanisms and the dial will be explained as follows: It is desirable that the massive and powerfully operating swaging mechanisms be spaced in uniform separation as closely together as possible so that the movements through a U-shaped path of the transferring chucks will be as short as possible, whereby such movements may be most quickly performed; and as organized the swaging mechanism requires stable and sufficiently bulky supporting framing such as represented at 25 and $25^a$; and because of the presence of the necessarily comparatively thick upright $25^a$ between the last set of swaging dies and the nearest cavity $n$ in the right hand portion of the dial, the spacing between such last swaging mechanism and the dial cavity just referred to is necessarily greater than (and in fact in this machine is exactly double) the distance between one set of the swaging dies and the next set.

While the machine might be so organized that the transferring chucks would carry the blanks from one set of swaging dies to the next and from the last set directly into the dial, this would necessitate a considerably wider spacing of the different sets of swaging dies and make necessary movements of the transferring chucks backward and forward through longer paths, rendering the machine less rapid in operation.

The dial having in the present instance six of the die cavities $n$, one of which is most clearly represented in Fig. $9^c$, is intermittently moved one-sixth of a revolution periodically and in proper time to carry the blank in the condition shown at $x^6$, Fig. $6^a$, downwardly and around to the position of the first punch die and then farther along to the position of the second punch die, and then diametrically opposite the point at which it was brought into the dial, at which place it is transferred to position between and to the action of the threading rolls; and the means for imparting the step by step revoluble movements to the dial will be now described. The dial E is affixed on the forward end of a shaft $o$ horizontally and transversely mounted in bearings of the frame and having near its rear extremity a wheel $o'$ provided with six radial grooves $o^2$ in its forward face and having six arc shaped recesses or depressions $o^3$, regularly spaced in its edge.

Below and parallel with the dial carrying shaft $o$ is another shaft $o^4$ which has at a short distance forwardly from its rear end a short revoluble crank arm $o^5$ provided with a stud or roller $o^6$ projecting from its rear face at its extremity. The shaft $o^4$ is driven by the bevel gear $o^7$, meshed by a bevel gear $o^8$ on a shaft $o^9$ which is horizontally and longitudinally mounted at the rear of the machine, and which has the bevel gear wheel $o^{10}$ at its left hand end in mesh with the bevel gear wheel $o^{11}$ on the shaft $e$, the manner of driving of which latter shaft has been heretofore described. The hub or shaft encircling portion of the revoluble crank arm $o^5$ in the plane coincident with the scalloped edge wheel $o'$ is made crescent shaped, that is with an arc shaped recess $o^{14}$ as indicated by the dotted lines in Fig. $7^b$, and shown in face view in Fig. $7^c$. Each time the crank-like lever $o^5$ makes a complete revolution its stud or roller $o^6$ engages into one of the radial grooves $o^2$ of the wheel $o'$ unitary with the dial E and forces it around one-sixth of a turn.

The arc shaped recess $o^{14}$ in the hub portion of the lever $o^5$, as represented in Fig. $7^b$, has its location in proximity to the nearest edge depression $o^3$ of the scalloped wheel so as to clear the wheel and leave it free for its rotative movement; but as the lever for carrying this stud $o^6$, after having forced the wheel around in its exact fractional extent desired, emerges and moves clear from its engagement in the radial groove, has its back or full segmental portion brought, somewhat in the manner of the rolling motion of a gear tooth, into the next arc shaped edge recess of the wheel and forms a positive lock, assuring the positioning of the dial with its die opening in proper place alined with the dies which coact therewith.

All of the die cavities in the dial are of the form shown in Fig. $9^c$, that is these cavities are formed in hardened pieces set in the dial and such cavities are cylindrical corresponding to the shank of the screw with a countersunk or enlarged forward orifice for the accommodation of the shouldered and slightly enlarged portion $x^{10}$, and a larger forward end countersink for the head of the blank.

The screw blanks in the two lower die cavities which are particularly indicated by $n^*$ in Figs. 2 and 7 have alined therewith a pair of axially horizontal punch dies $t$, both carried at the rear end of a slide $t^2$ fitted in transverse ways $t^3$ on the top of the machine frame and operated in proper time by the eccentric, or short throw cam $t^4$ on the front shaft $b^{10}$ through the connecting rod or pitman $t^5$.

At each reciprocation of the slide both of the punch dies strike at and form slots into the heads of the screw blanks positioned to receive such operations thereon, and the slot forming punch dies are of slightly different dimension and shape, the first being a rough slotting one and the second a finishing one; and in the striking against head ends of the blanks they are made to conform strictly to the contour of the die cavities in which they are located so that the shoulder for the underside of the head will be squared more perfectly than done by the swaging dies, the slightly enlarged portion $x^{10}$ rendered truly cylindrical, and the shank portion of the blank straightened so far as any slight requirement therefor exists. The punch dies also finish and perfect the convex heads of the blanks.

Each screw blank after having been operated on while at the lower portion of the dial by the punch dies $t$ $t$ and while in a position of rest horizontally to the left of the axis of the dial is forced by ejector 50 into, and to be taken by, a chuck $u$ which carries it a slight distance forwardly, then to the leftward and then rearwardly to the position represented in Figs. 1 and 9, to present the shank between, and to the action of, segmental threading dies $v$ $v$ circumferentially located on the cylindrical rolls or carriers $v^2$ therefor on parallel arbors, one of which is above another and both mounted in suitable bearings in the machine frame.

The ejector 50 comprises a rod which plays horizontally and transversely through an upright portion of the machine frame and which is in axial alinement with the die cavity in the dial horizontally to the left of the center of the carrier. This ejector is operated by a duplication of the mechanism heretofore described for the ejector $h$, the rear end of the rod being engaged by the yoke-formed end of an upstanding lever 52 which is carried on the rockshaft $h^3$,—this one shaft simultaneously actuating both ejectors. The chuck $u$ is horizontally mounted with its axis transversely of the machine, on an upper carriage or slide J which is understood as the counterpart of the one F for series of chucks 1 to 6, and which slide J is movably fitted for sliding movements longitudinally of the machine in a slideway $w$ in the lower carriage L which is a counterpart of the one G aforementioned.

The means for imparting the movements to the chuck in a U course through appropriate movements of the slides J and L is substantially identical with that described in conjunction with the motion imparting means for the slides F and G, that is to say: Referring to Fig. 10, the lower slide has in its under part a longitudinal groove $w^2$ engaging in which is a stud or block $w^3$ carried on a disk $w^4$ at the upper end of a vertical shaft $w^5$ having by bevel gearing $w^6$ and $w^7$ a connection with a shaft $w^8$ provided at its forward end with a pinion $w^9$ riding over and in mesh with which is a rack bar $w^{10}$ reciprocated by the engagement of the roller stud $w^{11}$ thereof in the peripheral cam groove $w^{12}$, the circular body in which such groove is formed being affixed on the aforementioned front shaft $b^{10}$. This last described mechanism imparts the short traverses to the slide L and the longitudinal movements of the upper slide J on the slide L, are imparted by means of the lug or stud $w^{13}$ upstanding from the disk $w^{14}$ and operating in the groove $w^{15}$ in the lower portion of the slide J,—the direction of which is transverse of the machine; the stud carrying disk $w^{14}$ is on the upper end of a vertical shaft $w^{16}$ having the bevel gearing $w^{17}$, and $w^{18}$ (see also Fig. 8) connection to be rotatively driven from the same shaft H as has to do with the motion imparting means for the already described carriage or slide F.

A sectional view vertically and transversely through the last described mechanism for imparting the movements at right angles to one of the slides J and L would be a substantial duplication of a portion of Fig. 6 already referred to, and further illustration of this second and similar slide operating mechanism is deemed unnecessary.

The arbors $v^3$, $v^3$, on which the rolls carrying the segmental threading tools $v$ are mounted in horizontal bearings of the machine one above the other, and the rotary movements of the threading rolls both in the same direction are imparted by driving means as follows:—The threading roll arbors have spur gear wheels $v^4$ at their rear ends, but not in mesh with each; but both of these are meshed by a larger spur gear wheel $v^5$ on a short stud shaft $v^6$. The comparatively large and intermediate gear $v^5$ is meshed with by a spur $v^7$ of smaller size, which is on a short shaft $v^8$ (carrying on its forward end a cam $y$ to be hereinafter referred to). The said shaft $v^8$ in addition to the spur gear wheel $v^7$ is provided with a bevel gear wheel $v^9$ which is in mesh with a bevel gear $v^{10}$ on the shaft $o^9$.

The driving mechanism last referred to for the thread rolls is so proportioned and designed that the rolls make one complete revolution whereby the threading dies or tools make one pass each by the other in proximity at every step of operation of the machine which includes the cutting off of a blank from the wire and the transferring of the blank from some one location to another.

For a very minute adjustment of the threading rolls for positioning them with their axes either slightly nearer or slightly farther apart according to whether deep or shallow threads are to be cut or the rolls are operating on blanks of slightly varied diameters, the threading roll arbors $v^3$, $v^3$, are fitted in eccentric sleeves $v^{12}$, Fig. 8; and each has on its outer end a worm wheel $v^{13}$ individually meshing with which are worms $v^{14}$ mounted for their rotative movements in bearings in the frame standard. The ends of the shafts or arbors on which the worms are formed or secured project endwise beyond the bearings therefor and are formed polygonal so that by the employment of a wrench each of the eccentric sleeve bearings may be adjusted as occasion therefor demands. The chuck $u$ having bodily the U-shaped movement is rotated to correspondingly rotate the blank so that while it is between the threading rolls the thread forming operation may be properly performed in a manner heretofore made known in patents of my own; and the simple expedient of a pulley $u'$ and overhead driving belt $u^2$ suffices.

The means for ejecting the blank from between the spring jaws of the chuck $u$ when the chuck is moved forwardly while in its left hand position to withdraw the threaded screw from between the threading rolls, comprises the ejector rod $u^4$, Figs. 1 and 8, fitted for slight endwise movement within the tubular body of the chuck and having its one end forwardly extended through the bracket $u^5$ on the slide $j$, the retracting spring $u^6$ normally maintaining the ejector rod in its rearward position. The device comprising the two lever arms $u^7$ and $u^8$ is pivotally mounted at the front of the carriage J; and in proper time when the carriage forwardly retires to withdraw the screw from its position between the threading rolls, the forwardly extending lever arm $u^8$ comes within the range of the revolving wiper or stud $u^9$ on the face of a revoluble carrier therefor, which carrier, in the present instance, is the cylindrical body in which the cam $w^{12}$ is comprised. The completed screws pushed out from the chuck $u$ will fall through an opening $u^{10}$, thereunder, in a bed and guided by a suitable chute to a receptacle for the reception thereof.

At the termination of the threading operation and while the chuck still holds the screw at its thread receiving position, any bur or feather at the end of the screw shank which may be left by the upset metal in the threading, will be removed by the bur removing tool $z$, represented in Fig. 9$^b$, and which is carried at the forward end of a horizontal stem $z^2$ which plays in an opening therefor in the frame. This tool is normally retired rearwardly, and advanced in its proper time through the action of the lever $z^3$ which is intermediately pivotally mounted on a suitable support therefor and has a depending stud engaging in the slot of the cam $y$ which is carried on the aforementioned shaft $v^8$. The point or inclined edge of the tool $z$ operates, however, to remove only an infinitesimal amount of metal from the end of the screw shank. Brushes M and felt wipers N are so mounted that the peripheries of the threading rolls, and the segmental threading dies or tools will run to the cleaning actions of these appliances in every revolution thereof.

It will be explained in respect of chucks 5 and $i$ that the spring jaws in the one $i$ are stronger than the jaws in the chuck 5, so that the blank carried to the one $i$ when forced thereinto and seized thereby will be held with such a strong grip that the forwardly retiring chuck 5 will strip itself from the blank; and it may be said of chuck 6 that its jaws are so formed that in moving rearwardly, when it is in its right hand position to take the blank from the chuck $i$, it engages by shoulder jaws thereof beyond the corner of the head next to the shank and thereby on its forward movement, by not having to rely on its spring capabilities, withdraws the blank from the chuck $i$. The ejector for chuck 6 not only expels the blank to deliver it into the dial die cavity but also, preparatory to such expulsion, mechanically opens the chuck jaws.

This description of combined ejector and chuck jaw opening means in itself involves no invention on my part, and the same is not particularly illustrated or further described.

I claim :—

1. In a screw machine, in combination, a wire guide, and a shear comprising a fixed member and a movable member, the latter having an aperture therein, a swaging mechanism, means for advancing wire intermittently through the apertured shear member, a mechanism, located forward of the apertured shear member, for rounding the advanced end of the wire, means for operating the movable shear member to sever the advanced portion of the wire subsequent to the rounding of its end and to cause the conveyance, by said movable shear member of the end-rounded, blank-constituting, portion of the wire in a direction toward the swaging mechanism.

2. In a screw machine, in combination, a wire guide and a shear comprising a fixed member and a movable member, the latter having an aperture therein, a swaging mechanism, means for advancing wire intermittently through the apertured shear member, a device for temporarily holding the wire in its advanced position, a mechanism, located forward of the apertured shear member for rounding the advanced end of the wire, means for operating the movable shear member to sever the advanced portion of the wire subsequent to the rounding of its end and to cause the conveyance, by said movable shear member of the end rounded blank constituting portion of the wire in a direction toward the swaging mechanism.

3. In a screw machine, in combination, a tubular wire guide, the forward end of which constitutes one member of a shear and a movable shear bar coacting with the tubular wire guide, having an aperture therethrough registering with the tube guide passage, and a swaging mechanism, means for advancing wire intermittently through the guide and apertured shear member, and means for operating such shear member, for severing the advanced portion of the wire and for causing its conveyance, by said shear mechanism, to the swaging mechanism.

4. In a screw machine, the combination with a tubular wire guide, the forward end of which constitutes one member of a shear, and which tubular wire guide has an opening leading transversely thereinto, a movable shear bar coacting with the tubular wire guide, having an aperture therethrough registering with the tube guide passage, a swaging mechanism, means for advancing wire intermittently through the guide and apertured member, a spring retracted wire holding rod movable in said transverse opening, cam actuated means for projecting and temporarily retaining the rod in its wire holding position, means for rounding the advanced end of the wire, and means for operating said movable shear bar for severing the advanced portion of the wire and conveying the blank from the shear bar in a direction toward the swaging mechanism.

5. In a screw machine, in combination, a wire guide, means for feeding wire intermittently therethrough, a shear bar coacting with the wire guide and having an aperture through which the advanced portion of the wire is passed, a rotative spindle mounted for axial movements in alinement with the wire guide and carrying a wire rounding tool at its extremity which is adjacent the shear bar and wire guide, means for rotating said spindle, and means for periodically endwise moving the spindle to carry said tool to its working action on its advanced end of the wire.

6. In a screw machine, in combination, a tubular wire guide, a shear bar, provided with an aperture therethrough, and having a reciprocating coaction across the forward end of the tubular wire guide, means for intermittently advancing wire through the guide and said shear bar, a spindle forward of and axially alined with the wire guide and bearings in which it is mounted for rotation, and also for endwise movements, a tool, for end rounding the advanced wire, carried at the extremity of said spindle, a grooved collar on said spindle, a forked lever engaging said grooved collar, a thrust rod connected with the lever, a cam actuating the thrust rod, and means for imparting a rotary movement to the spindle.

7. In a screw machine, the combination with a wire guide, means for feeding wire intermittently therethrough, a shear bar, having an aperture therein, movably coacting with the forward end of the wire guide and means for imparting reciprocatory movement to the shear bar, of a swaging mechanism, an ejector between the swaging mechanism and the movable shear bar, a chuck having movements alternately from positions alined with the ejector and with the swaging mechanism and having approaching and receding movements relatively to them, means for operating the ejector to force a blank from the apertured shear bar into the chuck, and means for imparting the stated movements to the chuck.

8. In a screw machine, in combination, a wire guide and shear mechanism coacting therewith and comprising a reciprocatory shear bar having an aperture therein, a swaging mechanism located offside from the wire guide and a reciprocatory ejector rod parallel with the wire guide and between it and the swaging mechanism, a blank transferring chuck having its location forward of the ejector and swaging mechanism movable from positions respectively in alinement with each and also having approaching and receding movements relatively thereto, means for operating the ejector rod to force a blank from the shear into the chuck, and means for imparting blank transferring and return motions to the chuck.

9. In a screw machine, in combination, means for feeding wire and means for severing portions of the wire to produce blanks of uniform diameter throughout their lengths, a plurality of companion swaging dies and movable holders on which they are supported, actuating means for the holders, periodically operative to close and open the companion dies, means for conveying the cylindrical blanks successively from the severing mechanism and presenting them for portions only of their lengths to the first set of swaging dies, and means for further carrying blanks from each set of swaging dies to subject the already reduced portions thereof to the further operations by the succeeding sets of such dies.

10. In a screw machine, in combination, a wire feeding mechanism, a mechanism for servering a blank constituting portion of the wire and for moving it transversely from the line of wire feed, a plurality of sets of swaging dies in regularly spaced arrangement, and an ejector, coacting with the severing mechanism between the line of wire feed and the first set of swaging dies and separated from the latter by a distance equal to the spacing between the several swaging dies, a plurality of regularly spaced blank transferring chucks and means for moving them in unison whereby the first one thereof is alternately in alinement with and proximity to the ejector and the others are respectively in alinement with and proximity to the swaging dies and whereby on a shift thereof the first chuck is in alinement with the first set of swaging dies and other of the chucks are in alinement with and in proximity to the succeeding sets of the swaging dies, and means for periodically actuating the ejector.

11. In a screw machine, in combination, a plurality of regularly spaced companion swaging dies and movable holders on which they are supported, actuating means for the holders, periodically operative to close and open the companion dies, a plurality of axially parallel transferring chucks regularly spaced corresponding to the separation of the swaging dies, all mounted on a common support, and means for reciprocatingly moving said support in a U-shaped path for transferring chuck-carried blanks successively to each swaging mechanism and from each to a position transversely therebeyond.

12. In a screw machine, in combination, wire feeding and severing mechanism, a plurality of companion swaging dies and movable holders on which they are supported, actuating means for the holders periodically operative to close and open the companion dies, means for conveying cylindrical blanks successively from the severing mechanism to the first set of swaging dies, means for further carrying the blanks from each set of swaging dies to subject them to the further operation by the succeeding sets of such dies, a die having a cylindrical cavity with an enlarged circular orifice, and means for transferring the blanks from the final set of swaging dies to the cylindrical cavity die.

13. In a screw machine, in combination, a plurality of companion swaging dies, the paired dies of one set having matching die depressions which are cross sectionally of semi-elliptical contours, and the paired dies of the next set having matching semi-cylindrical depressions, pairs of holders for the respective sets of dies mounted for swinging movements from fixed fulcrum points, means for swinging said holders for opening and closing said dies, a chuck movable to transfer a blank from the first set of swaging dies to the second set, means for imparting a quarter rotary movement to the transferring chuck, and means for imparting the transferring and return movements to such chuck.

14. In a screw machine, in combination, a plurality of companion swaging dies, having a side by side arrangement, the paired dies of one set having matching die depressions which are cross sectionally of semi-elliptical contour, with enlarged orifices of corresponding form, and the paired dies of the next set having matching semi-cylindrical depressions with enlarged orifices of corresponding form, pairs of holders for the respective sets of dies mounted for swinging movements from fixed fulcrum points, means for swinging said holders for opening and closing said dies, means for transferring a blank from the first set of swaging dies to the second set and means for imparting a quarter rotary movement to the blank between the time of its withdrawal from the first set of dies and its presentation into the second set.

15. In a screw machine, in combination, four sets of companion swaging dies, in side by side arrangement, the paired faces of the first and third sets having matching depressions of semi-elliptical contours but of different sizes and the paired dies of the second and fourth sets having matching depressions of semi-cylindrical contours and of different sizes, a plurality of chucks mounted for movements through U-shaped paths in front of the several sets of swaging dies for transferring a blank successively from the first to the second, from the second to the third, and from the latter to the fourth sets of swaging dies, means for imparting the transferring movements to said chucks, and means for imparting quarter rotary movements to said chucks during their blank transferring movements.

16. In a screw machine, the combination with a plurality of regularly spaced swaging mechanisms, of a series of correspondingly regularly spaced transferring chucks coöperating with the swaging mechanisms and all mounted on a common movable supporting slide, another slide on which the first one is movable in a direction at right angles to that of the movement of the slide thereon, and means for imparting movements to the said slides in directions at right angles to each other.

17. In a screw machine, in combination, a series of regularly spaced swaging mechanisms respectively comprising sets of companion dies having cavities of different cross sectional contours and a series of correspondingly regularly spaced transferring chucks coöperating with the swaging mechanisms and all mounted on a common movable supporting slide, another slide on which the first one is movable in a direction at right angles to the first slide movement, means for imparting movements to the slides in directions at right angles to each other, and means for imparting partial rotary movements to one or more of the chucks.

18. In a screw machine, the combination with a plurality of swaging mechanisms each comprising companion dies and means for opening and closing the same, of a slide having a plurality of chucks mounted thereon in separation corresponding to the separation of the swaging mechanisms and said slide having a straight groove way therein, another slide movable on the machine at right angles to the movement which the first slide has on such second slide and provided with a groove way therein at right angles to the groove way in the first named slide, shafts having eccentrically mounted revoluble members engaging in the groove ways of said slides, and means for imparting, periodically, partial rotary movements to said shafts.

19. In a screw machine, the combination with a plurality of spaced swaging mechanisms each comprising companion dies and means for opening and closing the same, of an upper slide having a plurality of chucks mounted thereon and spaced correspondingly to the separation of the swaging mechanisms, and said slide having a straight way therein, a lower slide movable on the machine bed at right angles to the direction in which the upper slide moves on the lower one and provided with a way therein at right angles to the way in the upper slide, a rotatable shaft having a cam, a rack bar reciprocated by the cam, a shaft having a gear wheel meshed by the cam and having a bevel gear wheel thereon, a shaft vertically journaled in the machine frame having a bevel gear wheel thereon in mesh with the first named bevel gear and having at its upper portion a disk provided with an eccentrically located stud movable in the way of the lower slide, another shaft vertically journaled in the bed and having at its upper portion an eccentrically located stud engaging in the way of the upper slide and means for imparting rotary reciprocating movement to the latter named shaft.

20. In a screw machine, the combination with a plurality of spaced swaging mechanisms each comprising companion dies and means for opening and closing the same, of an upper slide having a plurality of chucks mounted thereon and spaced correspondingly to the separation of the swaging mechanisms, and said slide having a straight way therein, a lower slide movable on the machine bed at right angles to the direction which the upper slide moves on the lower one and provided with a way therein at right angles to the way in the upper slide, a shaft vertically journaled in the machine frame and having an eccentrically carried stud at its upper portion engaging in the way of the lower slide, another shaft vertically journaled in the machine frame and having at its upper portion an eccentrically carried stud engaging in the way of the upper slide and having at its lower extremity a bevel gear wheel, a horizontally journaled shaft having a bevel gear wheel in mesh with said first named gear wheel and having a pinion gear wheel, a rack bar in mesh with said pinion gear wheel and in mesh with a stud thereon, and a rotary cam with which said rack bar and stud engages.

21. In a screw machine, in combination, a plurality of spaced swaging mechanisms, each comprising companion dies and means for opening and closing the same, of an upper slide having a plurality of chucks mounted thereon spaced correspondingly to the separation of the swaging mechanisms and one of said chucks being rotatively mounted and having a crank like member, a lower slide movable at right angles to the direction in which the upper slide moves, means for moving the slides in directions at right angles to each other and a member on the lower slide having an engagement with the crank like member extended from the rotatively mounted chuck.

22. In a screw machine, in combination, a plurality of spaced swaging mechanisms, each comprising companion dies and means for opening and closing the same, of an upper slide having a plurality of chucks mounted thereon, spaced correspondingly to the separation of the swaging mechanisms, several of said chucks being rotatively mounted, geared together, and one thereof having a crank-like member, a lower slide movable at right angles to the direction in which the upper slide moves, means for moving the slides in directions at right angles to each other, and a member on the lower slide having an engagement with the crank like member extended from one of the rotatively mounted chucks.

23. In a screw machine, in combination, a plurality of regularly spaced companion swaging dies and means for operating them, and a stationary chuck located in separation from the last one of the swaging mechanisms and having its blank receiving end in a plane substantially coincident with the fronts of the several pairs of swaging dies, a plurality of chucks in number greater than that of the swaging mechanisms, bodily carried on a common support, and means for moving said chuck support reciprocatingly through a U-shaped course for carrying blanks in unison to each of the swaging mechanisms, and for simultaneously conveying a blank from the last set of swaging mechanisms to delivery into said stationary chuck.

24. In a screw machine, in combination, a plurality of regularly spaced companion swaging dies and means for operating them, a stationary chuck and a die having a circular cavity to receive therein the shank and head of a screw blank, arranged in separation beyond the last one of the swaging mechanisms and having their blank receiving ends in a plane substantially coincident with the fronts of the several pairs of swaging dies, a series of chucks comprising as many thereof as the number of swaging mechanisms, with two additional spaced chucks corresponding to the stationary chuck and to the said circular die, all bodily carried on a common support, and means for moving said chuck support reciprocatingly through a U-shaped course for carrying blanks in unison to each of the swaging mechanisms, and for simultaneously conveying blanks from the last set of swaging mechanisms to delivery into said stationary chuck, and from the stationary chuck to said circular die.

25. In a screw machine, in combination, a plurality of regularly spaced companion swaging dies and means for operating them, a stationary chuck and die having a circular cavity to receive therein the shank and head of a screw blank, arranged in separation beyond the last one of the swaging mechanisms and having their blank receiving ends in a plane substantially coincident with the fronts of the several pairs of swaging dies, a series of chucks comprising as many thereof as the number of swaging mechanisms, with two additional spaced chucks corresponding to the stationary chuck and to the said circular die, all bodily carried on a common support, means for moving said chuck support reciprocatingly through a U-shaped course for carrying blanks in unison to each of the swaging mechanisms, and for simultaneously conveying blanks from the last set of swaging mechanisms to delivery into said stationary chuck, and from the stationary chuck to said circular die, an ejector provided for the last chuck of the movable series, and means for actuating the ejector for sliding the blank from the chuck into the circular die.

26. In a screw machine, the combination with mechanism for producing a screw blank comprising a head and a reduced shank, of a die having a circular cavity corresponding to the shape of the head and shank, means for transferring the blank from the mechanism by which it is formed to said circular die and means for striking a blow endwise to the blank in such die.

27. In a screw machine, the combination with a mechanism for producing a screw blank having a head and a reduced shank, of a die having a circular cavity corresponding to the shape of the head and shank, means for transferring the blank from the mechanism by which it is formed to said circular die, a die having a head slotting projection, and means for forcibly moving such die endwise against the blank in the circular die.

28. In a screw machine, the combination with a mechanism for producing a screw blank comprising a head and a reduced shank, of a revoluble dial having therein a series of regularly spaced die cavities corresponding to the shape of the blank head and shank, means for transferring a blank from the mechanism by which it is formed to one of said circular dies, means for intermittently rotating the dial to partially revolve the blank, means for endwise striking the blank in the circular die while in one of its revolubly transferred positions, thread rolling mechanism and means for transferring the blank from the dial while in another of its revolubly shifted positions to the action of the thread rolling mechanism.

29. In a screw machine, the combination with a mechanism for producing a screw blank comprising a head and a reduced shank, of a revoluble dial having therein a series of regularly spaced die cavities corresponding to the shape of the blank head and shank, means for transferring a blank from the mechanism by which it is formed to one of said circular dies, means for intermittently rotating the dial to partially revolve the blank, a punch die having a slot forming projection, and means for operating it for endwise striking the blank in the circular die while in one of its revolubly transferred positions, thread rolling mechanism, and means for transferring the blank from the dial while in another of its revolubly shifted positions to the action of the thread rolling mechanism.

30. In a screw machine, the combination with a mechanism for producing a screw blank comprising a head and a reduced shank, of a revoluble dial having therein a series of regularly spaced circular die cavities corresponding to the shape of the blank head and shank, means for transferring blanks in succession from the mechanism by which it is formed to said circular dies, means for intermittently rotating the dial to partially revolve the blanks, a pair of slot forming punch dies, and means for causing them to simultaneouly strike two of the blanks in the circular dies, thread rolling mechanism, and means for successively transferring the blanks from the dial while in another of its revolubly shifted positions to the action of the thread rolling mechanism.

31. In a screw machine, in combination, mechanism for swaging a cylindrical blank to reduce and elongate the same to form a shank, a rotary dial having a series of regularly spaced circular die cavities in circular arrangement for successively receiving the blanks therein, means for intermittently rotating the dial, means for transferring blanks from the swaging mechanism to the cavities in the dial, a punch die and means for reciprocating it to endwise strike the blanks in the successively advanced die cavities in the dial, a thread-rolling mechanism, a chuck, and means for imparting movements thereto from adjacent the dial to adjacent the thread rolling mechanism, and an ejector for forcing blanks from the dial into the chuck.

32. In a screw machine, the combination with a dial having regularly spaced circular die cavities, a shaft on which it is carried, a disk on said shaft provided with radial grooves in number and arrangement corresponding to the die cavities, and also having a correspondingly arranged series of edgewise located arc shaped depressions, of a rotatable shaft having adjacent said disk an arm provided with an offset stud operative in each revolution thereof to engage one of said radial grooves and having a crescent shaped hub operative to have locking and unlocking engagements in said depressions, means for rotating the second named shaft, means for successively conveying screw blanks to the die cavities, and a punch die, and means for reciprocating it relatively to the punch of the dial.

33. In a screw machine, in combination, a dial having regularly spaced die cavities and means for imparting intermittent rotary movements to the dial, thread rolling dies beyond the dial, a chuck movable to successively transfer blanks from the dial and present the shanks thereof between and to the action of the threading dies, an ejector for said chuck, a carrier for the ejector, and means for imparting movements in directions at right angles to each other thereto, a two-armed lever on the carrier, one arm of which coacts with the ejector and a stud or striker revoluble in a fixed plane and to the path of which the other lever arm is periodically brought by the chuck carrier.

34. In a screw machine, the combination with a pair of revoluble companion threading dies and means for revolving same, of a chuck movable to successively present the shanks of screw blanks between and to the action of the threading dies, a bur removing tool movably mounted and located in a line between and in proximity to the thread rolling dies, and adapted to have advancing and retiring movements, and means for imparting such movements thereto.

35. In a screw machine, the combination with a pair of revoluble companion threading dies and means for revolving same, of means for successively presenting the screw blanks with their shanks between and to the action of the threading dies, a stem having at its extremity a bur removing tool, and said stem being slidably supported in a line between and parallel with the axes of revolution of the threading dies, a lever engaging the stem, and a revoluble cam for periodically imparting advancing and retiring movements to the tool carrying stem.

Signed by me at Springfield, Mass., in presence of two subscribing witnesses.

GEORGE T. WARWICK.

Witnesses:
Wm. S. Bellows,
G. R. Driscoll.